United States Patent
Glocker et al.

(10) Patent No.: US 7,804,451 B2
(45) Date of Patent: Sep. 28, 2010

(54) WIRELESS COMMUNICATION DEVICE HAVING A REDUCED SAR VALUE

(75) Inventors: Wolfgang Glocker, Memmingen (DE); Stefan Huber, München (DE); Thorsten Kowalski, München (DE); Martin Oelschläger, Berlin (DE); Michael Schreiber, Aying-Göggenhofen (DE); Martin Weinberger, München (DE)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 10/527,768

(22) PCT Filed: Sep. 11, 2003

(86) PCT No.: PCT/DE03/02983

§ 371 (c)(1),
(2), (4) Date: Sep. 23, 2005

(87) PCT Pub. No.: WO2004/027924

PCT Pub. Date: Apr. 1, 2004

(65) Prior Publication Data

US 2006/0139216 A1  Jun. 29, 2006

(30) Foreign Application Priority Data

Sep. 12, 2002 (DE) ............... 102 42 386
Oct. 18, 2002 (DE) ............... 102 48 756

(51) Int. Cl.
*H01Q 1/24* (2006.01)

(52) U.S. Cl. ..................... 343/702
(58) Field of Classification Search ........... 343/702, 343/841, 846; 455/575, 90, 575.1, 575.3–575.5, 455/575.7, 575.8, 90.3

See application file for complete search history.

(56) References Cited

U.S. PATENT DOCUMENTS

| | | | |
|---|---|---|---|
| 6,246,374 B1 * | 6/2001 | Perrotta et al. | 343/702 |
| 6,421,016 B1 * | 7/2002 | Phillips et al. | 343/702 |
| 6,650,294 B2 * | 11/2003 | Ying et al. | 343/700 MS |
| 6,728,555 B1 * | 4/2004 | Pirila et al. | 455/566 |
| 7,065,379 B1 * | 6/2006 | Kim et al. | 455/550.1 |
| 2002/0061734 A1 * | 5/2002 | Ito | 455/90 |

FOREIGN PATENT DOCUMENTS

| | | |
|---|---|---|
| DE | 102 04 877 | 8/2003 |
| WO | WO 01/33665 | 5/2001 |
| WO | WO 02/15333 | 2/2002 |
| WO | WO 02/071534 | 9/2002 |

\* cited by examiner

*Primary Examiner*—Hoang V Nguyen
*Assistant Examiner*—Robert Karacsony
(74) *Attorney, Agent, or Firm*—K&L Gates LLP (57) ABSTRACT

In order to reduce the SAR value in a wireless communication device (MP), an additional, current-conducting corrective element (CE1) is coupled to and configured in relation to the printed circuit board (LP) and the antenna (AT1) such that the amplitude level (IM1, NIM1) and/or the phase angle of electrical currents (I3, I1, I2) on the antenna (AT1), the printed circuit board (LP), and the corrective element (CE1) are adjusted relative to each other in such a way that the SAR distribution resulting from such currents becomes minimal.

37 Claims, 3 Drawing Sheets

WIRELESS COMMUNICATION DEVICE HAVING A REDUCED SAR VALUE

BACKGROUND OF THE INVENTION

The present invention relates to a wireless communication device having a reduced SAR value with at least one circuit board and at least one antenna linked to the circuit board for emitting and/or receiving electromagnetic radio frequency fields.

With wireless communication devices it is desirable to keep as low as possible the dose of electromagnetic radiation imposed on the body tissue of a user wearing a wireless communication device on their body and/or bringing a wireless communication device into the area of their head in order to speak or to listen. A specific measurement criterion for the radiation burden to which the relevant user is actually subjected is, in particular, what is referred to as the SAR (Specific Absorption Rate) value. This specifies the specific absorption rate in Watts per Kilogram with which a specifiable tissue volume area, such as in the head of the relevant user, is thermally affected by the electromagnetic radio frequency fields. For determining the SAR values of wireless communication devices as a measure of the thermal heating of a specific volume area of tissue, a measurement method such as the one detailed in the proposed European standard EN 50361 is used.

SUMMARY OF THE INVENTION

The present invention seeks to provide a way in which the SAR value of a wireless communication device can be explicitly further reduced in a simple way. This is achieved for a wireless communication device of the type mentioned at the start in that at least one first additional, current-conducting corrective element for reducing the SAR value is coupled to the circuit board and embodied such that the amplitude level and/or phase angle of electrical currents at the antenna, the circuit board and the corrective element are adjusted in relation to each other such that the maximum of the SAR distribution in the body tissue of a user when wearing a wireless communication device or when bringing a wireless communication device close to the head area in order to speak and/or to listen is minimized.

At least one additional current-conducting corrective element is linked to the circuit board and embodied in such a way that the electrical current which comes to flow on it is adapted with regard to its amplitude level and/or phase angle to the electrical currents at the antenna and the circuit board such that overall, these currents result in an SAR field with a minimized maximum. In this way, "hot spots" subjected to impressibly high doses, that is tissue volume areas with a higher thermal load when compared to tissue volume areas with less heating when the relevant wireless communication device is used in accordance with specifications, such as when worn on the body or when moved into the user's head area for speaking or listening, are largely avoided. In other words, the characteristic SAR value for the relevant wireless communication device can be reduced further.

The present invention further relates to a circuit board with at least one additional SAR value-reducing corrective element for a wireless communication device in accordance with the present invention.

Additional features and advantages of the present invention are described in, and will be apparent from, the following Detailed Description of the Invention and the Figures.

DETAILED DESCRIPTION OF THE INVENTION

Figure 1:
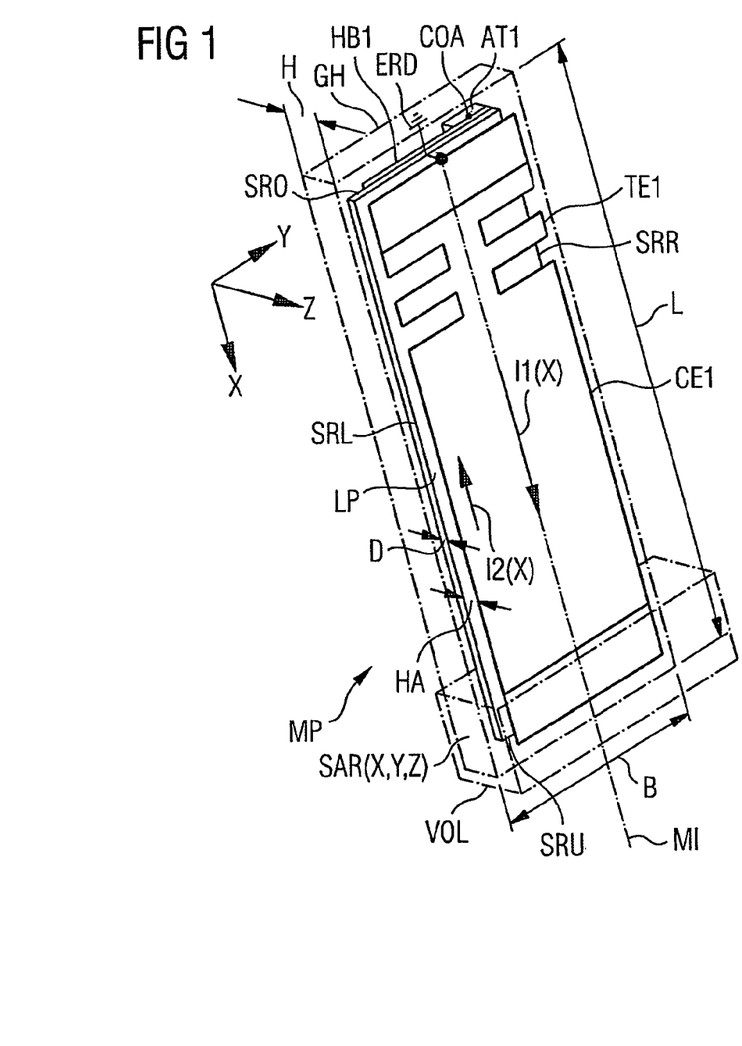
FIG. 1 is a schematic diagram showing a perspective view of a first exemplary embodiment of a wireless communication device in accordance with the present invention, of which the circuit board is linked to a first current-conducting, SAR-value reducing corrective element, into which, for harmonizing or tuning the current flow on the board, a second current-conducting corrective element is integrated.

FIG. 1 shows a three-dimensional schematic diagram of a typical first wireless communication device MP. To simplify the diagram, only those of its components are shown which primarily influence the SAR (Specific Absorption Rate) effect of the wireless communication device MP. Individually, this is a circuit card or circuit board LP as well as a radio antenna AT1 coupled to it, which, considered together, form an electromagnetic connection structure for transmitting and/or receiving radio frequency fields. The two components are accommodated together in the inside of a housing GH of thickness H of which the external contours are merely shown in FIG. 1 by dashed lines to reveal a view of the interior of the wireless communication device MP. On the circuit board LP are accommodated the usual electrical modules for transmitting and/or receiving radio signals such as a high-frequency module, an energy supply module (such as a battery or an accumulator) as well as one or more electrical modules for controlling the input and output elements of the wireless communication device (for example, its keyboard, display, loudspeaker, etc.) and for processing the radio signals received via the high-frequency module and/or to be emitted via this module. These electrical modules are omitted from FIG. 1 in order to make the diagram clearer. Only a part of the high frequency module HB1 is shown in the area of the upper end face SRO of circuit board LP. This high-frequency module HB1 is provided in a subarea of the upper half of the circuit board LP. Connected to it via a mechanical and electrical contact COA is the transmit/receive antenna AT1 for emitting and/or for receiving electromagnetic radio waves. It obtains the electrical energy of an energy supply unit from there, the unit also being omitted from FIG. 1 on grounds of clarity. The antenna AT1 is usefully arranged on that component placement side of circuit board LP which faces away from the head area of the user concerned when the wireless communication device is being worn on the body or when it is moved up to the head area so that the user can speak or listen. Here, in the exemplary embodiment of FIG. 1, the antenna AT1 is arranged on the rear of circuit board LP, with the front of the wireless communication device being assigned to that exterior surface of the housing which, in particular, features a display for the user.

The antenna AT1 is preferably embodied as a planar or flat antenna. In particular, what is known as a PIFA antenna (Planar Inverted F antenna) can be used for it. Of course, it also may be possible to accommodate other usual radio antennas on the circuit board LP; for example, stub antennas projecting out of the housing GH.

The antenna AT1 is embodied in the exemplary embodiment of FIG. 1 as an approximately rectangular shape. It is positioned with the aid of contacting COA extending from the upper side face SRO of the circuit board LP positioned into a space which is enclosed by the four side edges SRL, SRR, SRO, SRU of the circuit board along the standard edges of its component placement surface. The imaginary orthogonal projection of the antenna AT1 onto the component placement surface of the circuit board LP thus lies substantially within the limitation area spanned by the sides SRL, SRR, SRO, SRU of circuit board LP. In other words, the antenna AT1 does not extend beyond the four edges of the component placement surface of the circuit board LP. As such, the surface of the circuit board is neither lengthened nor widened by the connected antenna AT1. The antenna AT1 therefore lies like another layer above and/or below the layer plane of the circuit board LP within the space enclosed by its four sides. This antenna arrangement advantageously allows the device to be implemented with compact dimensions.

The circuit board LP of FIG. 1 essentially has a flat rectangular form when seen in a three-dimensional view; i.e., its four side edges SRL, SRR, SRO, SRU combined form the external contour of a rectangle. The dimensions of the circuit board LP (i.e., its length L and its width B) are preferably dimensioned such that the lengthwise extension L of the circuit board LP is greater than its width B. Their spatial geometrical relationships are illustrated in FIG. 1 by additionally showing the coordinates X, Y and Z of a Cartesian coordinate system on the diagram. In this case, the X coordinate extends along the long sides SRL, SRR of the circuit board LP, whereas the Y direction runs in parallel to the width sides SRO, SRU of the circuit board LP. The component placement surface of the circuit board LP thus lies essentially in the X,Y plane. The Z direction here is the height or thickness D of the circuit board LP with its various components such as the high-frequency module HB1 as well as other evaluation/control modules.

The rectangular form of the circuit board is preferably suited to installation in a flat, substantially cuboid housing such as housing GH of FIG. 1. The circuit board LP here in the exemplary embodiment of FIG. 1 is arranged with regard to its dimension (i.e., length L and width B as well as depth D) such that, in conjunction with the components connected to it, such as an antenna as well as the modules accommodated on it, it forms a substantially close fit with housing GH. In practice the dimensions of the circuit board (i.e., its length, width and depth) are essentially limited by the geometrical form of the desired housing. Depending on the form of design of the housing, the external contours of the circuit board are usefully selected so as to be adapted to the dimensions and geometrical form of the housing. The circuit board thus may have a circular, oval or any other geometrical shape.

This type of linked structure consisting of at least one circuit board and at least one radio antenna connected to it results during radio operation (i.e., when electromagnetic radiation fields are being emitted and/or received) in a flow of current on the circuit board. This is because the relevant circuit board, for example LP, operates in relation to the current feed point, for example COA, of the antenna linked to its front face, for example AT1, in a first approximation as a kind of supplementary second antenna branch to the actual radio antenna, for example, AT1, so that overall a radiation dipole is formed by the circuit board and the antenna linked to it. The relevant circuit board, for example LP, thus conducts current as a result of its electrical modules, their electromagnetic screening housing, connection tracks between the electronic components of the modules as well as other electronic components.

In particular, if the transmit and/or receive antenna AT1 of the wireless communication device MP of FIG. 1 is embodied as an $\Lambda/4$ antenna, this forms a radiation dipole together with the circuit board LP. If the radio antenna AT1 is switched to transmit and/or receive, a current flow I1 is generated on the circuit board LP with a main preferred direction along the longitudinal extent L. In FIG. 1, this directed current flow I1 on circuit board LP is characterized by an arrow in the X direction. In this case, it represents the total current $I1(X)$ at each lengthwise position X of the circuit board LP which results from the fact that at each lengthwise position X the part currents with a main preferred direction in the X direction are fictitiously summed or integrated over the total cross-sectional width B; i.e., in the Y direction. This longitudinal location-dependent distribution of the total current $I1(X)$ is shown schematically by a current flow diagram in FIG. 7 which refers to the circuit board LP of FIG. 1.

Figure 7:
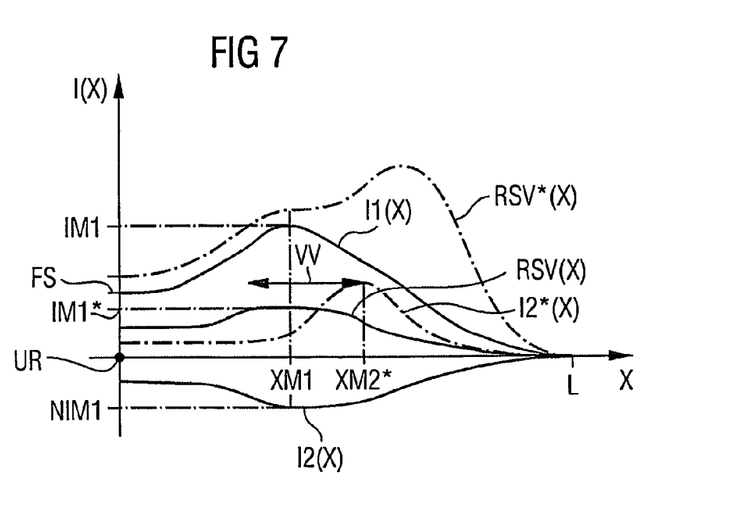
FIG. 7 shows a schematic view of the local distribution of the overall effective electrical current for the SAR effect, which, when the wireless communication device in accordance with FIG. 1 is operated, starts to flow along the longitudinal extent of its circuit board without and with the tuned corrective element in accordance with the present invention.

In FIG. 7, the X direction is entered along the abscissa whereas the ordinate of the total current $I1(X)$ summed over the total cross-sectional width B of the circuit board LP is assigned for different longitudinal location positions X along the longitudinal extent of the circuit board LP. With the local distribution of this total current flow there are, on the one hand, H and/or E fields (i.e., magnetic and/or electrical fields) correspondingly in an alternating relationship, which when the wireless communication device is worn on the body of a user, especially on bringing the relevant wireless communication device up to the head area of the relevant user to speak or listen, can cause a corresponding thermal heating of the organic tissue there, depending on the local distribution of maxima and minima. On the other hand, a further interaction between the electrical current flow $I1(X)$ with of a main preferred direction in the X direction on the circuit board LP and magnetic and/or electrical field strengths appears to be produced which arises locally in the area close to the antenna AT1 during its radio operation.

During investigation of the SAR effect, comprehensive tests with an H-field and/or E-field measurement probe in a model head which was filled with a glucose solution and to which a wireless communication device with a conventional circuit board corresponding to LP of FIG. 1 was applied, show that the thermal heating of the glucose solution in the model head varies or differs locally; i.e., there is a local, three-dimensional SAR distribution with maxima and minima. This locally varying, three-dimensional SAR field corresponds in a first approximation to a corresponding locally differing distribution of the total current I1(X) on the circuit board LP.

In FIG. 7, the origin UR of the X axis is assigned to the top side edge SRO (i.e., the upper face of the circuit board LP of FIG. 1) whereas the lower side edge SRU corresponds to the longitudinal extension location X=L. In the area of the electrical contacting point COA between the antenna AT1 and the circuit board LP at longitudinal point X=0 cm, the feed or base point current FS≠0 A flows to antenna AT1. With preferred use of an λ/4 antenna in this feed current or at least a proportion of it also flows at longitudinal point X=0 cm at the upper face side of the circuit board LP since the circuit board LP operates as an antenna extension branch for the Λ/4 antenna. At the lower face SRU of the circuit board LP opposite the antenna AT1 the current flow is interrupted in the longitudinal direction by the free end and thereby by the edge limitation there, so that, at the face SRU opposite the antenna AT1, the equation I(X=L)=0 A largely applies.

The further sequence of the summation current distribution I1(X) between the upper face SRO and the lower face SRU of the circuit board LP is affected by a large number of electromagnetic propagation/coupling factors. These preferably include the geometric form as well as the spatial dimensions of the circuit board LP. Its length L, in particular, has effects with the relevant radio frequency used on the electromagnetic waves propagated along the circuit board in the form of E- and/or H-fields and hereby on the resulting summation current distribution I1 (X). In the case in which an Λ/4 antenna is used and the length L of the circuit board is selected as Λ/4, the circuit board LP together with the Λ/4 antenna forms a resonant radiation dipole. The circuit board acts here in a first approximation as a type of supplementary Λ/4 antenna to antenna AT1. In this way, waves on the overall structure of the circuit board LP and Λ/4 antenna coupled to it, standing waves of the summation current I1 (X) can form with current nodes and antinodes.

For other coupling relationships of the coupling structure formed from the circuit board and antenna as well, there arises in practice a local distribution of the total current I1(X) which in the X direction (i.e., along the longitudinal extent of the circuit board LP) is not constant but fluctuates. A decisive influencing factor on the local distribution of the total current I1(X) when a rectangular-shaped circuit board is used is, in particular, its length in relation to the length of the antenna becoming electrically effective for the wavelength used to emit and/or receive electromagnetic radiation fields in radio operation.

In the vicinity of this local total current distribution I1 (X) an appropriate, corresponding, electromagnetic field is created or induced, which, when the wireless communication device MP is used according to specification can cause heating in the organic body tissue of a user and is primarily responsible for the location-dependent SAR distribution. Use according to specification is taken here to mean, on the one hand, that the relevant wireless communication device is held or worn at one point on the body of a user. Thus, for example, the wireless communication device can be attached to a strap hung around a user'neck or carried in the breast pocket of a jacket and can be set to receive and or transmit in this position. In practice, the relevant user often uses a headset; i.e., he/she communicates with the wireless communication device via a cable with connected micro-earpiece and microphone. On the other hand, the relevant wireless mobile wireless communication device is usually moved into position close to the user's head area to enable it to be used for speaking or listening and in this position is placed on the user's cheek between ear and mouth. The SAR effect which comes into effect in the local area of the relevant wireless communication device is, in this case, particularly in that local area which is below the distance 2D 21A (A is the wavelength; D is the device length).

For example, a GSM mobile radio network (Global system for Mobile Communications) operates in a frequency range between 880 and 960 MHz (mid frequency 900 MHz), which corresponds to an operating wavelength A of roughly 35 cm. As such, with a GSM radio system the local current distribution on the circuit board there is likely to be a penetration depth of the electromagnetic local field of around 1.7 cm. In the PCN (Private Commercial Network) (E-network) with a frequency band of between 1710 and 1880 MHz the wavelength lies at approximately 17 cm, so that the electromagnetic local field produced as a result of the local current distribution of the circuit board features a penetration level of around 1.0 cm. In a UMTS radio communication system with a frequency transmission rate of between 1920 and 2170 MHz the wavelength A amounts to around 15 cm, so that the penetration depth of the electromagnetic local field as a result of the local total current distribution on the main board reaches approximately 0.8 to 1 cm. The lower the local penetration depth into the tissue of the users is in this case, the higher the measured SAR value can be with the same assumed transmit power of the antenna. This is because, per prespecified volume of tissue a higher electromagnetic field density, a greater current flows and thereby a higher field concentration is generated.

So as now to be able to set the reduced SAR value of the relevant wireless communication device in a controlled way, at least a first additional current-conducting corrective element for SAR value reduction is coupled to the circuit board to the wireless communication device. In this case, it is coupled to the circuit board and embodied in such a way that the amplitude level and/or the phase angle of electrical currents on the antenna, the circuit board and the corrective element are set in relation to each other so that the maximum of the total SAR distribution resulting from these currents in the body tissue of a user is minimized when the wireless communication device is used as directed. In other words, the currents on the antenna, the circuit board and the corrective element can be explicitly tuned to each other such that the amount of the originally set absolute maximum (or the approximate maxima) in the local SAR field distribution of the electromagnetic fields coming into effect as a result of these currents are at their smallest. This avoids impermissibly highly-dosed "hot spots," (i.e., local tissue volume area of higher thermal loading in relation to tissue volume areas of lower heating) when the wireless communication device is used as directed. The reduction of the SAR peak values allows a kind of homogenization of the resulting SAR distribution to be achieved, which results because of the electrical currents on the antenna, the circuit board and the corrective element.

Different types of first corrective elements are specified in detail in the older Patent Application with the file reference DE 101 10 982.2.

FIG. 1 shows a first, current-conductive corrective element above the front component placement surface of the circuit board LP. It is indicated by the reference symbol CE1. It is positioned at a height HA from the circuit board LP as well as substantially in parallel to its component placement surface. The additional corrective element CE1 is, in this case, preferably assigned to that component placement surface of the circuit board LP which, when the wireless communication device is worn on the body and/or when the wireless communication device is moved into the user's head area for speaking and/or listening, is facing this area in order to reduce as much as possible the SAR effect in the direction of the relevant user. In this case it makes sense, as shown here in the exemplary embodiment of FIG. 1, to arrange the antenna AT1 on the component side of the circuit board LP opposite the corrective element CE1 (rear side in the FIG. 1).

The geometric form of the first corrective element CE1 of FIG. 1 essentially follows the rectangular-shaped external contour of the circuit board LP. The corrective element is thus embodied as a rectangular ring or frame and forms, viewed in the X,Y plane, a type of completely enclosed sleeve, which merely extends along the side edges SRL, SRO, SRR, SRU of the circuit board LP, but orthogonally (i.e., in the Z direction) with regard to its fictitious inner surface enclosed in the X,Y plane, is open or freely transparent. In this case the corrective element CE1 is positioned relative to the circuit board LP such that the external edge of its subsections lies essentially congruent to the external contour of the rectangular-shaped circuit board as a further layer. The basic geometrical shape of the loop-shaped corrective element CE1 forms a rectangular ring shape or frame shape matching the rectangular geometrical form of the circuit board LP. It can be formed by one or more wires, a single or multilayer, strip-type foil or by any other linear or flat element. Such an element also may be, for example, a metallization which has been applied to the internal surface of the housing by vaporization or galvanization. For the relevant corrective element such us CE1, an electrically-conductive material is also used if necessary, which also may be a dielectric and/or magnetically conductive material. In the present exemplary embodiment shown in FIG. 1, the corrective element CE1 features in detail along the two longitudinal edges SRL, SRR of the circuit board LP linear subsections and in the area of the upper and lower faces of the circuit board LP rectangular strip sections.

Expressed in general terms, it is worthwhile positioning the additional corrective element such that its imaginary orthogonal projection with regard to the component placement surface of the board essentially lies within a restricted area spanned by the two side edges. As such, the additional corrective element lies in a second layer plane to the first layer of the circuit board LP wherein a more compact design of wireless communication device is achieved. The original length and width dimensions of the circuit board LP are thus largely retained.

The first corrective element CE1 is connected electrically to the ground of the circuit board LP in the area of the upper face SRO of the circuit board LP, this point being indicated by a ground symbol ERD. As an alternative, it also may be worthwhile to connect the first corrective element CE1 capacitively or inductively to the circuit board LP; i.e., to omit the electrical connection ERD. If necessary, a combination of electrical, capacitive and/or inductive coupling can be worthwhile. The electrical coupling shown here in the exemplary embodiment of the corrective element CE1 to the circuit board LP causes an electrical current I2(X) to flow in the loop structure of the corrective element CE1.

In the present exemplary embodiment, the geometrical conditions of the circuit board LP in the form of a longitudinal rectangle are selected so that the size of the current amplitude or current density of the total current I1(X) without the use of the corrective element CE1 lies, for example, somewhere in the center of the circuit board LP, that is in the area of the point of intersection of its surface diagonals, whereas the current density reduces towards the two end faces or width sides SRO, SRU. In FIG. 7, the absolute maximum of the total current the I1(X) on the circuit board at the longitudinal point XM1 is indicated by IM1. Since the additional corrective element now features current-conductive tracks at the point at which the local current distribution of the total current I1(X) of the circuit board LP is less than IM1, the total current level can be increased there and, thereby, an evening out of the overall resulting total current can be achieved (compensation effect).

Because of the numerous electromagnetic coupling mechanisms, such as different forms of geometry and/or dimensions of circuit board, antenna and/or first corrective element, it can in practice be critical even just at the first corrective element to set the phase angle and/or amplitude level of the electrical currents at the antenna, the circuit board and the corrective element to each other such that the resulting SAR distribution produced is satisfactorily reduced.

To be able to provide an improved opportunity of effecting the resulting overlaid overall current flow effective for the SAR effect on the circuit board, the corrective element, and the antenna, it is worthwhile providing additional parts for balancing or tuning the phase angle and/or the amplitude height of the electrical current on the first corrective element and/or the circuit board.

In FIG. 1, a second, current conducting corrective element TE1 is connected to the first corrective element CE1 as a way of harmonizing or tuning for matching the current flow to the first corrective element in the effective connection. It is an integral component of the first corrective element since it is inserted in the form of a serpentine loop structure into the rectangular-shaped internally open basic loop of the first corrective element CE1 and is thereby electrically connected to the latter. The additional serpentine loop of the second corrective element allows the current path in the overall intercoupled structure of the first and second corrective elements to be modified advantageously such that an electrical current flow I2(X) is caused there which runs a largely against the phase of the current flow I1(X) on the circuit board LP. Here, in the exemplary embodiment of FIG. 1, the overall current flow path of the overall structure made up of the first and second corrective elements is extended compared to a purely rectangular basic loop by inserting the serpentine of the second corrective element.

In FIG. 7, in the summation current diagram I(X), the local execution sequence of a summation current I2*(X) is shown which overall could start to flow on the first corrective element CE1 without the coupling of the second corrective element TE1. In a first approximation, this overall current I2*(X) flows in phase with the overall current I1(X) on the circuit board LP. At the longitudinal local point XM2*, it exhibits a maximum current level which lies below the current level distribution of its overall current I1(X) and is shifted in relation to the longitudinal point XM1 of the current level maximum IM1 of the overall current I1(X). The overlaying of these two electrical summation current curves produces a total current curve RSV*(X), which lies above the original summation current curve I1(X) of the circuit board LP. In other words, the superposition of the summation current curves I1(X), I2*(X) without the second additional corrective element as a way of tuning would lead to the formation of an even higher amount of local current level maximum so that the result would be an undesirably increased SAR effect.

Figure 4:
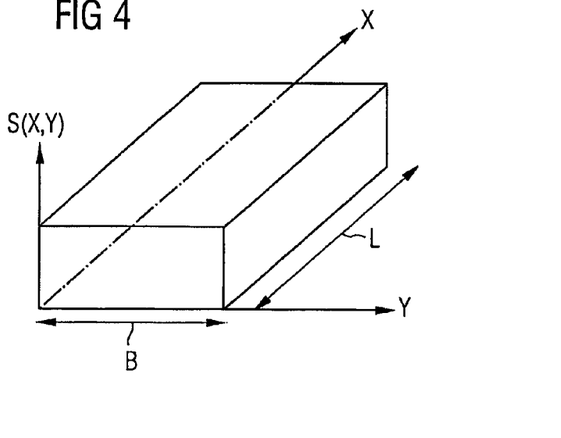
FIG. 4 shows a three-dimensional schematic of an idealized, largely harmonized SAR field viewed over the total area of the circuit board of the wireless communication device in accordance with FIG. 1, which adjusts itself as a result of the overlaid overall current flow of the electrical currents on the circuit board, the first and second corrective elements connected to it, as well as the antenna as a whole and, with regard to its amplitude values, is smaller than without any correction measure.

Only with the aid of the second, current-conducting corrective element TE1, because of its additional serpentine loops, can the circuit length or the current path length of the first corrective element CE1 be improved, such that on the overall structure of the two corrective elements CE1, TE1 connected end-to-end to each other an out-of-phase current flow I2(X) to current flow I1(X) is effected. This out-of-phase current flow I2(X) is shown in FIG. 7 in the fourth quadrant with negative current level values I(X) in addition to the positive current values I(X) of the summation current I1(X) in the first quadrant. The out-of-phase overall current I2(X) on the two connected corrective elements CE1, TE1 thus runs in the opposite direction to the summation current I1(X) on the circuit board LP. It exhibits a maximum NIM1 at around the same point at which the summation current I1(X) of the circuit board LP has an absolute maximum IM1. Because of this opposing complementary current level curve I2(X) on the two coupled corrective elements CE1, TE1, a maximum compensation effect is produced for the maximum of the summation current level I1(X) of the circuit board LP. Overall, through the superposition of the local distribution of the summation current I1 (X) of the circuit board LP and of the corrective overall current I2(X) on the first and second corrective element, this produces an overlaid overall current flow RSV(X), which only exhibits a reduced, smoothed current level maximum IM1* in relation to the original current level curve I1(X). The local distribution of the overlaid overall current flow RSV(X) is thus largely homogenized i.e., it runs in a first approximation at a constant level. At least impermissibly high current peaks are largely avoided. This type of evened out resulting current level curve of the superposition current from the summation current I1(X) of circuit board LP and the corrective current I2(X) of the first and second corrective elements CE1, TE1 is accompanied by an SAR field which is constant in a first approximation viewed over the entire surface L.B of the circuit board LP. FIG. 4 shows this type of idealized, two-dimensional SAR distribution S(X,Y) viewed over the entire surface L.B of the circuit board LP. Looked at spatially, this additional tuning element for the first SAR value corrective element actually results in a three-dimensional SAR value distribution SAR (X,Y,Z) with an approximately homogeneous electromagnetic field strength curve. This three-dimensional SAR value distribution can be specified for a predefined volume area VOL all around the housing GH of the relevant wireless communication device, which is indicated in a section of FIG. 1 by dashed lines.

By a corresponding setting of the number and/or the length of the serpentines of the second corrective element TE1 the overall corrective current I2(X) which starts to flow in the two corrective elements CE1, TE1 can be tuned or adapted to different local curves of the summation current I1(X) of the circuit board LP. In particular, the degree of out-of-phase characteristic of the correction current I2(X) as well as the amplitude level of the absolute maximums of this correction current I2(X) can be set. The setting of the phase angle and/or amplitude of the correction current I2(X) in particular allows the position of the maximum IM1 of the summation current I1(X) of the circuit board LP to be shifted, which is indicated in FIG. 7 by an arrow W pointing along the X direction. The shifting is expediently undertaken so that the SAR distribution is homogenized as much as possible. Such a shift in the absolute maximums of the summation current on the circuit board in less critical areas of the device, such as down to the lower face SRU, for example, may well already lead to an improvement in the measured SAR value.

The second corrective element TE1 is added in FIG. 1 into the first corrective element CE1 with regard to the center line MI running in the X direction through the middle of the width sides SRO, SRU of the circuit board LP largely symmetrically to its axis so that overall a symmetrical structure with regard to the center line MI for the overall combination or for the overall structure of first and second corrective element is produced.

If necessary, a coupling structure including a circuit board, antenna and/or corrective element can be worthwhile, in which the corrective element in its imaginary orthogonal projection protrudes beyond the side limits with regard to the circuit board.

Preferably, the respective second corrective element, such as example TE1, is dimensioned such that the component placement area of the circuit which it factitiously encloses corresponds at most to 0.2 to 0.5 times the area of the circuit board surface; for example, L.B enclosed by the first corrective element, such as CE1.

In practice, it is also preferable in such cases to arrange the first and/or second corrective element at a height of between 0.1 and 0.6 cm away from the component placement surface of the circuit board.

Figure 2:
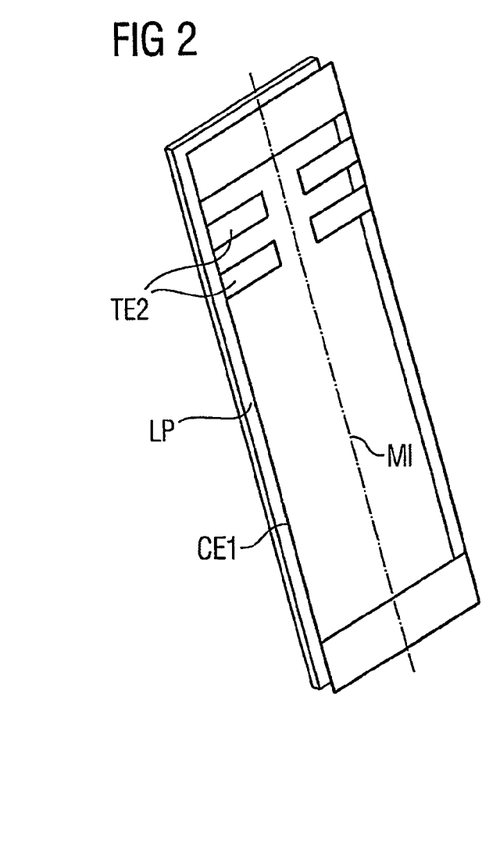
FIG. 2 shows a schematic diagram of the circuit board of the wireless communication device according to FIG. 1 with the first connected, SAR value-reducing corrective element, into which, for tuning the current flow there, a modified second current-conducting corrective element compared to the one shown in FIG. 1 is integrated.
Figure 3:
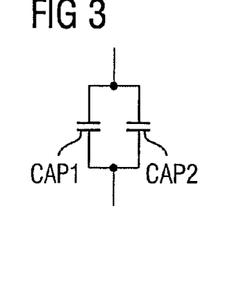
FIG. 3 shows a simplified, electrical equivalent circuit diagram for the SAR value-reducing, first corrective element of FIG. 2 with the assigned, second corrective element, relating to their coupling to the circuit board.

FIG. 2 shows a three-dimensional schematic of the circuit board LP of FIG. 1 with a coupled corrective element structure consisting of the first corrective element CE1 and a modified second corrective element TE2 compared to that shown in FIG. 1. The second corrective element TE2 is formed by strip-type conductor elements known as "patches." These strip-type, flat conductor elements TE2 run substantially orthogonally to the longitudinal extent L of the first corrective element CE1 in the same layer plane. To harmonize or tune the corrective current I2(X), flowing through this coupled structure made up first and second corrective elements CE1, TE2, one or more patches can be provided. The number of these patches, their spacing in the longitudinal direction and their patch surface dimensions are advantageously selected such that the corrective current I2(X) essentially runs out of phase to the summation current I1 (X) of the circuit board LP. FIG. 2 shows two consecutive patches (=patch pair) with a specified longitudinal spacing symmetrical to the axis with regard to the center line MI of the circuit board LP coupled to the first corrective element CE1, and in such a way that the patches lie within the surface area enclosed by the sides of circuit board LP. This parallel coupling of the strip-type elements of the second corrective element TE2 to the first corrective element CE1 provides an additional capacitive load related to the circuit board LP. By appropriate selection of the additional capacitive load, this also allows an overlaid total current flow RSV(X) to be set which is largely compensated for (see FIG. 7). FIG. 3 shows a simplified diagram of this parallel coupling of an additional capacitive load CAP2 through the second corrective element TE2 in addition to capacitive load CAP1 which is formed between the first corrective element CE1 and the circuit board LP.

In FIGS. 1 and 2, the serpentine loops or loop elements of the second corrective element TE1 or TE2 are integrated in each case into the rectangular-shape basic loop of the first corrective element CE1; i.e., connected electrically to the first corrective element. In this case, the two corrective elements can be composed of similar form elements or different form elements to one another. In FIG. 2, for example, the linear longitudinal sides of the first corrective element CE1 are connected to the strip-type flat elements of the second corrective element TE2. In addition or independently of this, it also may be sufficient to couple the first and second corrective elements capacitively or inductively to each other.

Figure 5:
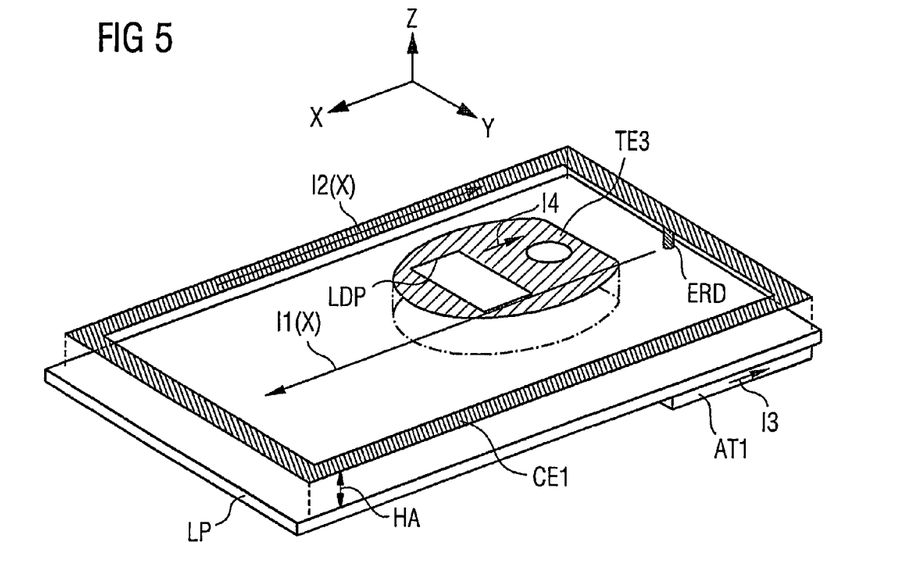
FIG. 5 shows a three-dimensional schematic view of a further embodiment of a wireless communication device in accordance with the present invention, in which the parts for tuning the phase angle and/or amplitude of the electrical current are modified on the first corrective element compared to the harmonization or tuning parts of the wireless communication device of FIG. 1.

FIG. 5 shows a three-dimensional schematic of the coupling structure between the circuit board LP and the first corrective element CE1 of FIG. 1, with a second corrective element TE3 now being provided separately from the first corrective element and separately from the circuit board LP as a tuning part. This second corrective element TE3 is typically formed here by an ESD (ESD=Electrostatic Discharge) protection element, particularly by a metallic display window. The cutout for the display of the wireless communication device MP is indicated by the letters LDP in FIG. 5. The second corrective element TE3 is essentially positioned in the area of the center line MI in the upper half of the circuit board LP such that its imaginary orthogonal projection in relation to the component placement surface of the circuit board LP in the X,Y plane comes to lie within the surrounding surface which is enclosed by the side edges of the circuit board. This ESD protective element is embodied as a flat component and lies in a plane parallel to the component placement surface of the circuit board LP at a specified height from the board. The first corrective element CE1 and the second corrective element TE3 are positioned in about the same plane on the same side of the circuit board. Preferably, they are accommodated on the front side of the wireless communication device (i.e., where the device's display is accommodated) and not on the back of the wireless communication device. As such, the antenna volume of the antenna AT1 on the rear of the circuit board remains largely unaffected by the corrective element on the front so that impermissibly large emission losses of the useful antenna power are avoided. It also may be preferable to arrange the second corrective element TE3 in a different plane from the plane of the first corrective element CE1 but which belongs to the same side of the circuit board.

The second corrective element TE3 is capacitively and/or inductively coupled to the first corrective element CE1 and/or to the circuit board LP. Especially by matching the height from the component placement surface of the circuit board LP as well as the geometrical form of the conductive ESD protective element surface and/or the cutout surface of the display window LTP of the second corrective element TE3, the corrective current I2(X) in the first corrective element CE1 together with the current flow I4 on the second corrective element TE3 can be tuned or compensated in such a way that, overall, an overlaid total current RSV(X) composed of the corrective current I2(X), the corrective current I4, and the circuit broad current I1(X) results, which, viewed over the longitudinal extent of the circuit board LP, is largely evened out or homogenized. To this end, the corrective current I2(X) and, where necessary, the corrective current I4 preferably will be set with the aid of the second corrective element TE3 such that these currents in total run largely out-of-phase to the summation current I1(X) of the circuit board LP (see FIG. 7).

If necessary, it also may be sufficient, with the aid of the at least second corrective element, for the electrical current in the first corrective element to be tuned so that, although it does not run out-of-phase with the circuit board current I1(X), it causes an increase in the overall current level at those longitudinal points viewed in the X direction at which the original circuit board current level I1(X) is smaller than IM1. It also enables an evening out of the overall current level to be achieved to a certain degree and thereby a homogenization of the SAR distribution.

To obtain in a specifiable volume area all around the relevant wireless communication device, an SAR value distribution which is as even as possible, in which local maxima are largely avoided, it also may be possible, where necessary, to provide a pair of corresponding corrective elements also on the rear of the circuit board where the antenna is arranged. This can be of interest if what is known as "body worm" must also be adhered to on the back of the device. In this way, prespecified SAR values also may be complied with if the wireless communication device is worn on a belt in the stomach area, in which case the rear of the device is usually pointing in this direction. The same applies if the device is carried on a neck chain or a chest strap. In some circumstances here, a spatial arrangement or layout of the corrective elements in which the first corrective element is assigned to the front side of the circuit board and its tuning element to the rear side.

Figure 6:
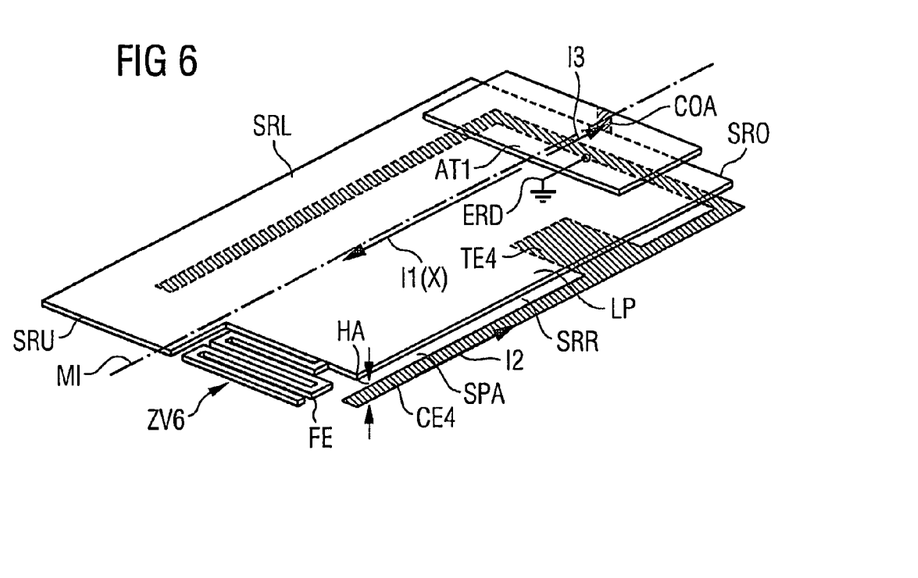
FIG. 6 shows a three-dimensional schematic view of a further embodiment of a wireless communication device in accordance with the present invention with further, alternative tuning parts for the SAR value-reducing corrective element of this wireless communication device.

FIG. 6 shows a three-dimensional schematic of the coupling structure formed from the circuit board LP and the antenna AT1 for the wireless communication device MP, viewed from the rear; i.e., from the antenna-side component placement surface. Unlike in FIG. 1, a first corrective element CE4 is now formed by an open rectangular loop in the X,Y-plane (layer plane of the circuit board LP); i.e., the first corrective element CE4 features strip elements merely in the edge zone area along the edges of the longitudinal sides SRL, SRR, as well as along the upper side edge SRO of the circuit board LP, whereas the linear subsection of the corrective element CE1 of FIG. 1 in the area of the lower side edge SRU of the circuit board LP has been omitted. The first corrective element CE4 thus essentially exhibits the geometrical shape of a rectangular U; i.e., it is embodied in the shape of a U-profile. It is arranged on that component side of the circuit board, which faces away from the antenna connection for the antenna AT1. Its three different subsections, strip-shaped in each case, lie in approximately the same layer plane parallel to the component placement surface of the circuit board LP as well as at a height HA from this surface. In detail, a strip or linear-shaped side part of the first corrective element CE4 extends along the left side edge SRL, a corresponding second strip-shaped side part extends along the right edge of the circuit board LP, on a symmetrical axis in relation to its center line MI, as well as a third similarly embodied subsection along the upper side edge SRO of the circuit board LP. This first corrective element CE4 is, with regard to its external contour, preferably positioned substantially congruent to the two longitudinal side edges SRL, SRR as well as to the upper side edge SRO of the circuit board LP in a layer plane at a height HA.

Viewed in general terms, it is preferable to position the first corrective element CE4 in a parallel layer plane to the circuit board LP such that its imaginary orthogonal projection with regard to the component placement surface of the circuit board LP essentially lies within the restricted area spanned by the latter's side edges SRL, SRR, SRO, SRU. For example, the first corrective element CE4 can be reduced with regard to its width and length such that it fictitiously only surrounds a part of the central zone of the component placement surface of the circuit board LP.

A second corrective element TE4 in the area of the right side edge SRR of the circuit board LP is coupled to the first corrective element CE4 of FIG. 6 which particularly lies transverse, especially in the Y direction (i.e., orthogonally) to the longitudinal extent of the circuit board LP as a strip-type surface element. It is connected electrically to the first corrective element CE4. It serves as an individual element for tuning the corrective current I2(X), which starts to flow in the first corrective element CE4 with the second corrective element TE4 coupled to it to the extant that, overall, an overlaid total current flow from the electrical current I1(X) on the circuit board LP, the corrective current I2(X) on the corrective element structure CE4 and TE4, and the electrical current I3 on the antenna AT1 is largely evened out or homogenized, so impermissibly high absolute maxima in the overall current level are largely avoided.

In addition or independently of the second corrective element TE4, it can, if necessary, also be worthwhile to provide a corrective element for adapting the current I1(X) on the circuit board LP itself in addition to the first corrective element CE4. In FIG. 6, a third additional current-conducting corrective element ZV6 is coupled to the circuit board LP and embodied as a way of tuning such that the phase angle and/or amplitude level of the electrical summation current I1 (X) on the circuit board LP also may be harmonized or tuned. Such a tuning part for the circuit board current can be formed by a virtual mass extension of the circuit board LP. Various options for virtual current path extension are specified in detail in the older unpublished patent application with the file reference DE 10204877.0. In FIG. 6, a sub-area of the mass surface of the circuit board itself is embodied such that an additional extending element ZV6 is produced for virtual mass extension. The corrective element ZV6 is, in this case, an integral component of the mass surface of the circuit board LP with original rectangular external contour. In this case, a sub-area of the mass surface of circuit board LP on the face side SRU opposite the antenna AT1 is embodied separately from the antenna in the same layer plane such that it operates as an extension of the current path starting from the antenna feed point COA in the direction towards the lower face side SRU of the circuit board LP. The corrective element ZV6 has a serpentine form consisting of serially consecutive 90° nicks or rectangular-shaped zig-zag bends or bar sections. This serpentine corrective element ZV6 can be manufactured by punching or cutting out from the original rectangular circuit board LP of FIG. 1. The corrective element ZV6 is preferably provided in a corner area of the lower circuit board face side SRU which is arranged at an angle, particularly diagonally opposite the antenna coupling in the corner area of the upper opposite face side SRO. Through this largely diagonal path between the antenna AT1 and the free end FE of the corrective element ZV6, the greatest possible virtual path extension for the effective summation current with regard to the SAR effect on the board surface available with the same prespecified rectangular external contour is provided.

Expressed in general terms, through folding of a third corrective element within the circuit board component placement surface and/or, if necessary, via the upper side of the circuit board and/or the lower side of the circuit board the circuit path on the circuit board itself can be set in a controlled way. Through the serpentine form (i.e., through a shaping of the corrective element) in which a subsection extending in the longitudinal direction of the circuit board alternates with a section transverse, especially orthogonal, to the longitudinal extension of the circuit board and in each case two such consecutive subsections enclose an angle other than 0 between them, the length of the corrective element in the X direction can be kept relatively short. This is because the zig-zag form allows a greater run length to be obtained for the electrical current compared to a corrective element with a straight form of strip. The maximum possible current path on the circuit board LP of FIG. 6 thus begins in the area of the antenna AT1 and ends at the free end FE of the corrective element ZV6 after passing through its serpentine windings. Preferably, the third corrective element with its one or more folds is accommodated in one or more layer planes which lie within the component placement plane delimited by the sides of the circuit board. In this case, the corrective element also may be arranged spaced at a height from the component placement surface of the circuit board. In this way, the originally specified dimensions of the circuit board are largely retained, so that a compact, miniaturized design can be achieved for the wireless communication device.

The fact that at least one corrective element is electrically, capacitively and/or inductively coupled to the circuit board as a way of tuning the circuit board current also allows the amplitude level and/or phase angle of the electrical currents I3, I1, I2 on the antenna AT1, the circuit board LP, as well as the first corrective element CE4 to be set in relation to each other so that the relevant absolute maximum of the SAR-distribution produced overall as a result of these currents I1, I2, I3 is maintained.

With one or more of these different corrective elements in accordance with FIGS. 1 through 7, it thus becomes possible to influence and reduce the SAR value of a wireless communication device even in the development phase and to do it both in one-dimension in a measurement plane parallel to the front or the rear side of the wireless communication device, and also three-dimensionally in a specifiable volume area around the housing of the relevant wireless communication device.

Comprehensive tests have successfully shown that a first advantageous option for reducing the SAR value consists of placing a contacting current-conducting corrective loop on the top of the printed circuit board (PCB) which essentially runs in part or completely along the sides of the circuit board. With this variant, the original given SAR value can be reduced by up to 75% compared to the initial situation without corrective element.

This value, however, cannot be obtained with just any corrective loops, since in practice a majority of influencing factors (such as presepecified geometrical form and dimensions of antenna and circuit board) can enter into the SAR distribution of the coupling structure of circuit board and antenna in a non-controllable way. A targeted or controlled minimization of the absolute maximum or the maxima of the SAR distribution through a simple individual correction loop thus can in practice, be rendered more difficult under some circumstances. An optimization of the SAR distribution can, however, be achieved during manufacture with the aid of at least one second corrective element coupled to the first corrective element and/or to the circuit board, which equalizes or tunes the phase angel and/or amplitude level of the electrical currents on the antenna, the circuit board and the corrective element to each other such that the SAR field produced in the body tissue is evened out as much as possible. A further optimized reduction of the SAR effect is also produced if, to tune the phase angle and/or amplitude of the electrical current on the first corrective element and/or circuit board, additional tuning parts are provided in such as way that the total resulting overlaid current flow on the circuit board, the corrective element and the antenna causes, in a first approximation, a homogeneous SAR field viewed over the entire area of the circuit board. This is accompanied by a more homogeneous SAR value distribution on the other sides (e.g., upper side, lower side, rear) of the radio communication device.

Considered in summary, an optimum SAR distribution can be achieved by a corresponding adjustment of the first corrective loop. Two measures are essentially worthwhile here. A first worthwhile possibility is to modify the length of the loop. This leads to a different phase angle of the current on the correction loop. In additional to or independently of this, changing the length also allows the amplitude of the current on the correction loop to be changed. In this way, the local distribution of the corrective current on the corrective loop can be shifted in a longitudinal direction of the circuit board so that the overall current level is raised there, where before the original circuit board current was smaller than the maximum originally present. The spatial redistribution of the original circuit board current from its absolute maxima away into those areas which previously had a lower current level achieves a certain evening out. With the use of this type of simple correction loop, however, its maximum length is limited by the length of the outer or inner edge of the housing of the wireless communication device and thereby also the possible compensation factor or tuning factor to even out the summation current distribution.

If it is necessary, as a result of the given size of the wireless communication device as well as of other given electromagnetic coupling circumstances to change the correction loop, especially to further extend it, to achieve a further optimization of the SAR value, it is worthwhile shaping the loop in specific sub-areas in a serpentine form, as is shown, for example, in FIG. 1. A second option for extending the correction loop while retaining the original length and width dimensions of the coupling structure of circuit board and antenna is provided by the parallel coupling of at least one so-called patch structure to the first corrective element. This is illustrated in FIG. 2. The patches shown in FIG. 2 within the loop structure of the first corrective element also can, where necessary, be capacitively or inductively linked in. This too leads to a changed current distribution on the loop as a result of changed capacitive load circumstances and thereby to a changed SAR value. These patch structures also may be a metallic structure used for other purposes, such as an ESD protection element which operates in conjunction with the above first corrective element. This further variant is shown in FIG. 5.

A further option for improving the SAR behavior is produced through the additional modification of the currents on the circuit board through a virtual extension of the circuit board. An optimum phase and amplitude position between the currents on the circuit board, corrective element and antenna also may be achieved in this way.

Expressed in general terms, an explicit combination of different measures is thus advantageous which, in themselves, already partly exhibit a SAR value influencing effect, but in their combination lead to a significantly better result than individually. In this case, partly non-linear superposition effects of the various measures in relation to each other are explicitly utilized. In particular, this can be done by electrically and mechanically extending a first corrective element in a targeted way despite restricted device size by using a serpentine design. On the other hand, a further improvement can be obtained by explicit simultaneous use of two different measures, namely corrective loop and additional patch component which, although they already have an individual effect in themselves, together exhibit a far greater effectiveness that the sum of the individual effects, and because additional Patches (see FIG. 2) optimize the current distribution in the first corrective loop. A further worthwhile combination option is, additionally or independently of the effect of the currents in the loop, to explicitly change the currents on the circuit board itself through at least one further corrective element, such as ZV6 in FIG. 6, for example. This can, in particular, be a virtual circuit board extension. This also enables an optimum amplitude and phase position to be achieved. Measurements with a concrete development model for a wireless communication device have produced for the SAR value, for example, the following reduced values (in percent) related to a wireless communication device without loop and without metallic display window (100%=initial situation):

device with first correction loop without metallic display window as tuning element: 86% (relative to the initial situation);

wireless communication device without first correction loop with metallic display window as additional tuning element: 66%;

wireless communication device with first corrective loop and metallic display window as additional tuning element in accordance with FIG. 5: 56%.

This is sufficient for a large number of practical situations and is advantageous by virtue of its simple construction and ease of handling.

Although the present invention has been described with reference to specific embodiments, those of skill in the art will recognize that changes may be made thereto without departing from the spirit and scope of the present invention as set forth in the hereafter appended claims.

The invention claimed is:

1. A wireless communication device, comprising:
at least one circuit board;
at least one antenna coupled to the at least one circuit board for at least one of emitting and receiving electromagnetic radio energy fields; and
at least one first current-conducting corrective element coupled to the at least one circuit board, wherein the at least one first current-conducting corrective element comprises at least one current conducting track for increasing a current level capacity in the at least one first current-conducting corrective element relative to a total current level capacity directly from the at least one circuit board, and wherein the at least one first current-conducting corrective element is embodied such that at least one of an amplitude level and a phase angle of electrical currents on the at least one antenna, the at least one circuit board, and the at least one first current-conducting corrective element, is adjusted in relation to each other to distribute the electrical currents in a substantially even manner, and to reduce electromagnetic exposure which results from the electrical currents.

2. A wireless communication device as claimed in claim 1, further comprising an additional tuning part for tuning at least one of the phase angle and the amplitude level of the electrical current on at least one of the at least one first current-conducting corrective element and the at least one circuit board, wherein an overlaid total current flow resulting from the electrical currents on the at least one circuit board, the at least one first current-conducting corrective element and the at least one antenna has an overall effect of producing a substantially homogeneous specific absorption rate (SAR) distribution in one of a specifiable surface area viewed from a side of the at least one circuit board facing the user and in a specifiable volume area around a coupling structure of the at least one circuit board and the at least one antenna coupled thereto.

3. A wireless communication device as claimed in claim 1, further comprising at least one second current-conducting correcting element for additionally tuning the current flow on at least one of the at least one first current-conducting corrective element and the at least one circuit board such that a changed electrical current flow on at least one of the at least one first current-conducting corrective element and the at least one second current-conducting corrective element is caused which runs substantially out-of-phase to the current flow on the at least one circuit board, wherein, as a result of the overlaid total current flow on the at least one circuit board, at least one of the at least one first current-conducting corrective element and the at least one second current-conducting corrective element and the at least one antenna taken together, a substantially homogeneous SAR distribution over one of an overall area of a side of the at least one circuit board facing the user and in a specifiable volume area around a coupling structure of the at least one circuit board and the at least one antenna coupled thereto results.

4. A wireless communication device as claimed in claim 1, wherein the at least one first current-conducting corrective element is electrically connected to ground of the at least one circuit board.

5. A wireless communication device as claimed in claim 1, wherein the at least one first current-conducting corrective element is at least one of coupled capacitively and coupled inductively to the at least one circuit board.

6. A wireless communication device as claimed in claim 3, wherein the at least one second current-conducting corrective element is electrically connected to at least one of the at least one first current-conducting corrective element and the at least one circuit board.

7. A wireless communication device as claimed in claim 3, wherein the at least one second current-conducting corrective element is at least one of capacitively coupled and inductively coupled to at least one of the at least one first current-conducting corrective element and the at least one circuit board.

8. A wireless communication device as claimed in claim 3, wherein the at least one second current-conducting corrective element is an integral component of at least one of the at least one first current-conducting corrective element and the at least one circuit board.

9. A wireless communication device as claimed in claim 3, wherein the at least one second current-conducting corrective element is provided separately from at least one of the at least one first current-conducting corrective element and the at least one circuit board.

10. A wireless communication device as claimed in claim 1, wherein the at least one first current-conducting corrective element is embodied as a loop which at least partly extends along side edges of the at least one circuit board.

11. A wireless communication device as claimed in claim 10, wherein the loop for the at least one first current-conducting corrective element is substantially embodied as a rectangle.

12. A wireless communication device as claimed in claim 3, wherein the at least one second current-conducting corrective element is embodied as one of a serpentine loop structure and at least one flat element.

13. A wireless communication device as claimed in claim 3, wherein at least one of the at least one first current-conducting corrective element and the at least one second current-conducting corrective element is arranged at a specifiable height from the at least one circuit board.

14. A wireless communication device as claimed in claim 13, wherein the specifiable height is between 0.1 and 0.6 cm away from a component placement surface of the at least one circuit board.

15. A wireless communication device as claimed in claim 3, wherein the at least one first and at least one second current-conducting corrective elements are substantially positioned in a same layer plane.

16. A wireless communication device as claimed in claim 3, wherein the at least one second current-conducting corrective element is arranged in a layer plane which is different from a layer plane of the at least one first current-conducting corrective element.

17. A wireless communication device as claimed in claim 3, wherein the at least one second current-conducting corrective element is formed by an Electrostatic Discharge (ESD) protective element, the ESD protective element including a metallic display window.

18. A wireless communication device as claimed in claim 3, wherein the at least one second current-conducting corrective element runs substantially orthogonally to a longitudinal extent of the at least one first current-conducting corrective element.

19. A wireless communication device as claimed in claim 3, wherein the at least one second current-conducting corrective element is positioned and dimensioned in such a way relative to at least one of the at least one circuit board, the at least one antenna, and the at least one first current-conducting corrective element that a minimum resulting SAR distribution is produced at around a resonance frequency in radio operation of the at least one antenna.

20. A wireless communication device as claimed in claim 3, wherein the at least one second current-conducting corrective element is dimensioned such that a component placement surface of the at least one circuit board enclosed by the at least one second current-conducting corrective element corresponds at most to 0.2 to 0.5 times a part of the at least one circuit board surface enclosed by the at least one first current-conducting corrective element.

21. A wireless communication device as claimed in claim 3, further comprising at least one third additional current-conducting corrective element on the at least one circuit board coupled and embodied as a tuning part such that for the electrical current generated on the at least one circuit board, an explicit current path extension is effected while simultaneously substantially retaining original specified length and width dimensions of the at least one circuit board.

22. A wireless communication device as claimed in claim 21, wherein the at least one third current-conducting corrective element is arranged in an area of an end face of the at least one circuit board which lies opposite an end face of the at least one circuit board having a connection area of the at least one antenna.

23. A wireless communication device as claimed in claim 21, wherein the at least one third current-conducting corrective element is embodied in a serpentine shape.

24. A wireless communication device as claimed in claim 21, wherein one or more of the at least one current-conducting corrective elements is assigned to a component placement surface of the at least one circuit board which, when the wireless communication device is worn on the body of the user or when the wireless communication device is brought up to the head area of the user for speaking or listening, is facing the respective body or head area of the user.

25. A wireless communication device as claimed in claim 21, wherein one or more of the at least one current-conducting corrective elements is arranged on a component side of the at least one circuit board opposite the at least one antenna.

26. A wireless communication device as claimed in claim 21, wherein one or more of the at least one current-conducting corrective elements is positioned such that an imaginary orthogonal projection of the at least one current-conducting corrective element in relation to a component placement surface of the at least one circuit board substantially lies with a delimitation area spanned by at least two side edges of the at least one circuit board.

27. A wireless communication device as claimed in claim 26, wherein one or more of the corrective elements is assigned as at least one further layer in a spatial area which is at least one of within, above, below, and to a side of the delimitation area spanned by the at least two side edges of the at least one circuit board.

28. A wireless communication device as claimed in claim 21, wherein one or more of the at least one current-conducting corrective elements is at least one of: an electrically conductive material, a dielectric material, and a magnetically conductive material.

29. A wireless communication device as claimed in claim 21, wherein one or more of the at least one current-conducting corrective elements is formed by at least one selected from the group consisting of: at least one wire-type component; at least a single layer electrically conductive foil; and at least a single layer covering.

30. A wireless communication device as claimed in claim 21, wherein at least one of the at least one current-conducting corrective elements is formed by at least one coating layer in at least one of a lower shell and a upper shell of a housing of the wireless communication device.

31. A wireless communication device as claimed in claim 21, wherein at least one of the at least one current-conducting corrective elements is manufactured using punch/bend technology and is arranged at a specifiable height above a component placement surface of the at least one circuit board.

32. A wireless communication device as claimed in claim 1, wherein the at least one circuit board is substantially embodied in a rectangular shape.

33. A wireless communication device as claimed in claim 1, wherein the at least one antenna is embodied as one of an Λ/4 antenna and a PIFA antenna which, together with the at least one circuit board, form a radiating dipole.

34. The wireless communication device of claim 1, wherein a maximum Specific Absorption Rate (SAR) distribution is reduced which results overall from the electrical currents.

35. A method for manufacturing a device, comprising:
coupling an antenna to a circuit board; and
coupling a current-conducting corrective element to the circuit board, wherein the current-conducting corrective element comprises at least one current conducting track for increasing a current level capacity in the current-conducting corrective element relative to a total current level capacity directly from the circuit board, and wherein the current-conducting corrective element is embodied such that at least one of an amplitude level and a phase angle of electrical currents on the antenna, the circuit board, and the current-conducting corrective element, are arranged in relation to each other to distribute the electrical currents in a substantially even manner, and to reduce an electromagnetic exposure which results from the electrical currents.

36. The method of claim 35, wherein a maximum Specific Absorption Rate (SAR) distribution is reduced which results overall from the electrical currents.

37. A wireless communication device, comprising:
at least one circuit board;
at least one antenna coupled to the at least one circuit board for emitting and receiving electromagnetic radio energy fields; and
at least one current-conductive corrective element that compensates current to reduce overall current away from the at least one circuit board by increasing current on the at least one current-conductive corrective element in a direction opposite of current flowing on the at least one circuit board, wherein the current-conducting corrective element comprises at least one current conducting track for increasing current on the at least one current-conductive corrective element in a direction opposite of current flowing on the at least one circuit board, wherein said current-conducting track increases a current level capacity in the at least one first current-conducting corrective element relative to a total current level capacity directly from the at least one circuit board, and wherein the at least one current-conducting corrective element is embodied such that at least one of an amplitude level and a phase angle of electrical currents on the at least one antenna, the at least one circuit board, and the at least one current-conducting corrective element, is adjusted in relation to each other to distribute the electrical currents in a substantially even manner, and to reduce electromagnetic exposure which results from the electrical currents.

* * * * *